United States Patent
Hiranandani et al.

(10) Patent No.: US 12,063,326 B1
(45) Date of Patent: Aug. 13, 2024

(54) SYSTEM AND METHOD FOR DETERMINING A PURPOSE OF A CALL

(71) Applicant: Dialpad, Inc., San Ramon, CA (US)

(72) Inventors: Pooja Hiranandani, Ontario (CA); Elena Khasanova, Seattle, WA (US); Shayna Anne Gardiner, Kitchener (CA); Cheng Chen, Burnaby (CA); Simon Henderson Corston, New Westminster (CA)

(73) Assignee: DIALPAD, INC., San Ramon, CA (US)

( * ) Notice: Subject to any disclaimer, the term of this patent is extended or adjusted under 35 U.S.C. 154(b) by 0 days.

(21) Appl. No.: 17/463,395

(22) Filed: Aug. 31, 2021

(51) Int. Cl.
| | |
|---|---|
| *H04M 3/00* | (2024.01) |
| *G06N 5/04* | (2023.01) |
| *G06Q 30/0201* | (2023.01) |
| *G10L 15/18* | (2013.01) |
| *G10L 15/22* | (2006.01) |
| *H04M 3/51* | (2006.01) |
| *G06Q 30/016* | (2023.01) |

(52) U.S. Cl.
CPC ............ *H04M 3/5175* (2013.01); *G06N 5/04* (2013.01); *G06Q 30/0201* (2013.01); *G10L 15/1815* (2013.01); *G10L 15/22* (2013.01); *G06Q 30/016* (2013.01)

(58) Field of Classification Search
CPC ... H04M 3/5175; G06N 5/04; G06Q 30/0201; G10L 15/1815; G10L 15/22
See application file for complete search history.

(56) References Cited

U.S. PATENT DOCUMENTS

| | | | |
|---|---|---|---|
| 2018/0240028 A1* | 8/2018 | Baracaldo Angel | G06N 5/02 |
| 2021/0201916 A1* | 7/2021 | Touret | G10L 15/26 |
| 2022/0229876 A1* | 7/2022 | Carbune | G06F 16/9538 |

OTHER PUBLICATIONS

Khasanova, Elena, "Conversation Analysis: Literature Review", Date Unknown, 8 pgs.
Hiranandani, Pooja, "A Tale of Two Models", Towards Data Science, https://towardsdatascience.com/a-tale-of-two-models-6c0c7a14d1c9, Jul. 26, 2021, 6 pgs.
Hiranandani, Pooja et al., "Call Purpose Spotlight Series—Ch. 2: A Romp Through The Data", https://www.dialpad.com/blog/call-purpose-data-deep-dive/, Jul. 14, 2021, 9 pgs.
Hiranandani, Pooja et al., "Call Purpose Spotlight Series—Ch. 1: I Just Called to Say I Love You (and Other Reasons People Call)", https://www.dialpad.com/blog/call-purpose-ch-1/, Jul. 8, 2021, 10 pgs.

(Continued)

Primary Examiner — Rasha S Al Aubaidi
(74) Attorney, Agent, or Firm — PATENT LAW WORKS LLP

(57) ABSTRACT

A computer-implemented method of predicting purpose of call for a call center is disclosed to support various analytical functions, Automatic discovery of call topics, clustering of topics, and assigning of utterance to clusters may be provided. In some implementations, a pipeline includes an inference engine that includes a machine learning model trained on call transcripts and call attribute data to predict purpose of call.

14 Claims, 27 Drawing Sheets

(56) References Cited

OTHER PUBLICATIONS

Khasanova, Elena, "Why We Built Natural Language Processing Into Our Phone System", https://www.dialpad.com/blog/natural-language-processing-phone-system/, Apr. 22, 2021, 13 pgs.

Nazareth, Catherine et al., "Need to Build Rapport With Your Customers?", https://www.dialpad.com/blog/building-rapport/, Sep. 9, 2021, 11 pgs.

Dialpad Team, "Dialpad Release Roundup - Jan. 2021", https://www.dialpad.com/blog/new-year-new-business-communications-features/, Feb. 10, 2021, 8 pgs.

* cited by examiner

Call Purpose Phrases

Expressions of Desire or Intent

Problem Statements

Purpose of Call Suggested by the Call Recipient

Utterances That Follow A Purpose Of Call Prompt

SYSTEM AND METHOD FOR DETERMINING A PURPOSE OF A CALL

FIELD OF THE INVENTION

The present disclosure generally relates to automatically determining the purpose of a call between a customer and an agent in a call center environment. A variety of additional analytics functions can be performed based on call purpose data.

BACKGROUND

Many businesses interact with customers through contact call centers in which agents communicate with customers using, for example, voice calls or video calls, although text messaging is sometimes also used. For example, in a ticketing paradigm, tickets are generated that track a client support issue from initial customer contact to completion of the call. For example, customers may interact with agents who answer questions, address complaints, or resolve support issues that customers have.

Customer service is extremely important. It's extremely important in a contact call for managers to understand why customers called. However, it's surprisingly difficult to generate useful information about the reasons customers called. Only a small percentage of customers respond to surveys. Agents and managers in a call center are busy and multitasking. It's difficult for them to manually create accurate notes about the purpose of a call.

More generally, there is a larger and more general problem associated with the practical difficulties of manually creating notes about a purpose of a call.

Embodiments of this disclosure were developed in view of these and other problems and drawbacks in the prior art.

SUMMARY

A call center utilizes an inference engine to identify a purpose of call for each call based on a call transcript and call attribute data. In one implementation of a method, transcripts of customer support calls and associated call attribute data are provided as inputs to an inference engine that automatically identified call purpose statements.

In one implementation, transcripts and call attribute data of customer calls are provided as inputs to an inference engine configured to predict a call purpose for utterances having phrases indicative of a call purpose. An initial set of topics is automatically generated from the predicted call purposes. Topics are clustered, and utterances are assigned to topic clusters. The inference engine may use heuristics or a machine learning model.

In one implementation, the inference engine utilized a machine learning model and generated live updates during a call to clarify a call purpose during a call as additional utterances become available relevant to determining call purpose.

In another implementation, a call summary is generated for a call that identified a call snippet that includes the purpose of the call. The call snippet may be simplified to eliminate portions not relevant to the purpose of the call. The call summary may also identify a location in the call where the simplified call snippet occurs.

Many other optional features are variations include a variety of analytical function and visualizations to utilize the purpose of call information.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 1B is a diagram illustrating utterances related to call purpose.

FIG. 11F is a screenshot showing another example of a display of live calls, participant information, sentiment information, and call purpose in accordance with an implementation.

FIG. 11G is a screenshot showing a display of CSAT, call purpose, and agent information in accordance with an implementation.

FIG. 11K illustrates a screenshot of a word cloud implementation in accordance with an implementation.

DETAILED DESCRIPTION

The present disclosure describes systems and methods for automatically identifying a purpose of a call based on the call transcript and call attribute data. Call purpose statements are identified in utterances associated with a call. Additional analytics functions may also be provided. The call purpose may be identified for a live call or for a recorded call.

A call purpose statement typically occurs within a conversation in accordance with implicit rules of conversation. In a call center environment, for example, a customer who initiates a call engages in a conversation with an agent. Certain portions of the call are more likely to contain a call purpose statement than other portions of the call.

Figure 1A:
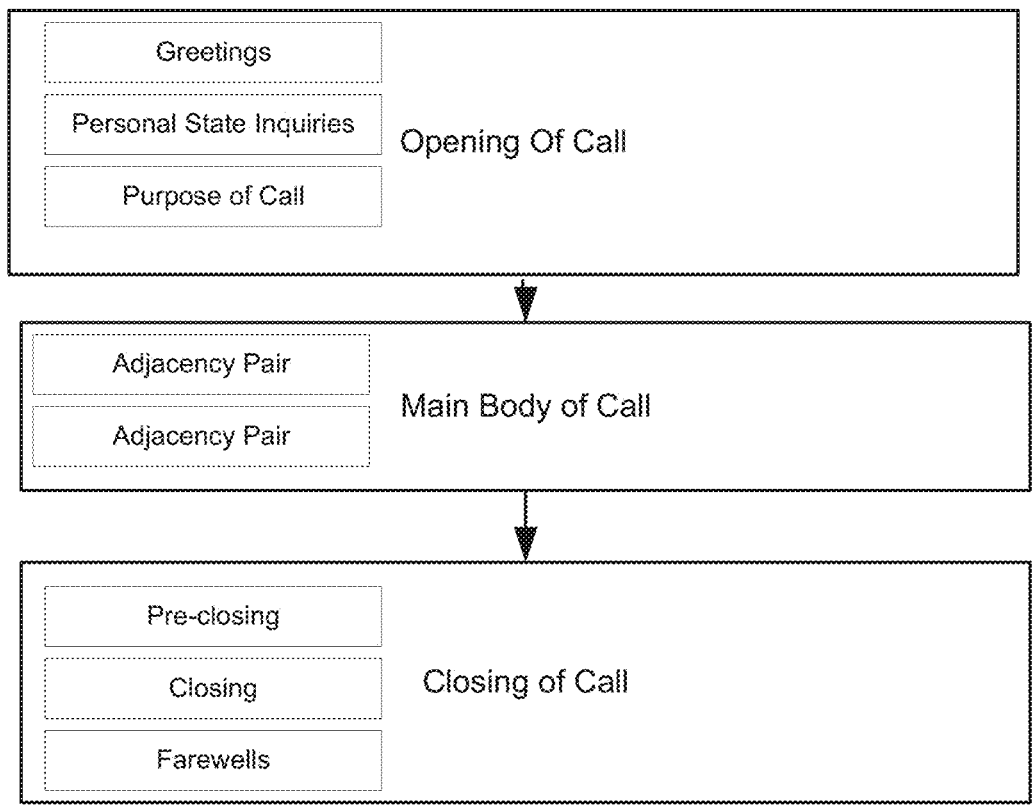
FIG. 1A is a diagram illustrating an example of conversation analysis.

FIG. 1A illustrates a framework for conversation analysis for the purposes of illustrating some aspects of how a purpose of a call can be determined. Speakers in a conversation have a variety of strategies for engaging in a conversation. An analysis of a typical conversation may include a sequence of turns speaking. An adjacency pair is two adjacent utterances produced by different speakers. Utterances are often organized into adjacency pairs such as question/answer or greeting/greeting. FIG. 1A illustrates aspects of a typical conversation. An opening of a call may include greetings, personal state inquiries, and a purpose of a call. There may be a main body of a call, and then a final closing of a call. In many customer service calls, the purpose of the call often occurs early in the call. However, there may be exceptions and variations to this simple example.

FIG. 1B illustrates another example of a conversation analysis. A call may have call purpose phrases (e.g., "I'm calling to return my computer"). It may include expressions of desire or intent (e.g., "I need help"). It may include problem statements (e.g., "my software won't boot up"). It may include a purpose of call suggested by the call recipient (e.g., an agent saying, "So do I understand correctly that you want to return your computer?"). It may also include utterances that follow a purpose of call prompt. There are other implicit rules in conversations. There are a variety of different call statements an individual customer may make to directly or indirectly state their reason for calling and the specific reason they are calling. For example, a customer may call and say, "I'm calling because I have a problem with my computer" and further elaborate or clarify the specific reason. "My computer needs a new battery."

Figure 2A:
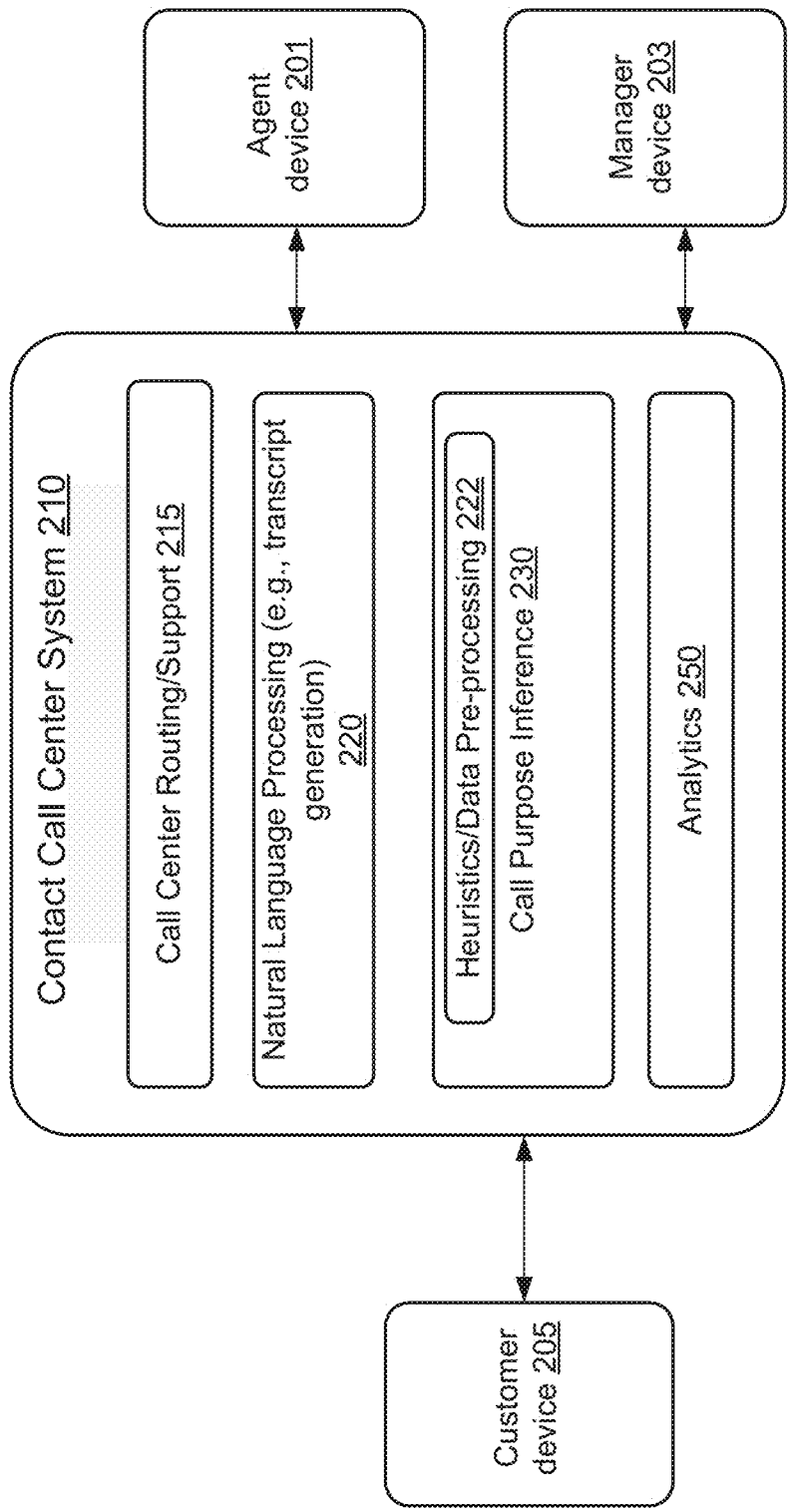
FIG. 2A is a block diagram illustrating an implementation of a contact call system with an inference module using heuristics to predict call purpose in accordance with an implementation.

Heuristics or machine learning techniques may be used to determine a purpose of call (POC). FIG. 2A illustrates a contact call center system 210 to handle calls from customer devices 205 served by agents at agent devices 201 and monitored by managers at manager devices 203. The contact call center system 210 may include a call center/routing support module 215 to route calls between individual customer devices to individual agent devices. For example, each agent may have a queue of calls to handle and an algorithm is used to route calls based on factors such as the length of the agent's queue, the agent's experience, etc. A natural language processing module 220 generates a transcript from a call. In one implementation, a call purpose inference module 230 includes a heuristics/data pre-processing module 222 to process call transcripts and apply heuristic rules to determine the purpose of call.

A heuristic model may be based on a linguistic analysis of call transcripts to identify words, phrases, and other call features (e.g., time in call, agent speaking or customer speaking) that are indicative of an utterance corresponding to a purpose of call. That is, heuristic rule combinations may be identified for words, phrases, regexes, and other features such as utterance length, discourse context, and time of occurrence of an utterance within a call. This may include regular expressions to identify call purpose phrases, expressions of desire or intent, problem statements, purpose of call suggested by the call recipient, and utterances that follow a purpose of call prompt The heuristic model may include rules to decide an utterance is a purpose of call based on its position within a conversation and a presence of a specific phrase (or more generally a phrase pattern) extracted from regex matches, with utterances scored based on specific features.

A summary of call module 228 may be included to generate a summary of call. For example, the summary of call may identify the purpose of the call along with other information, such as call sentiment, length of call, agent information, etc. The summary of call module may identify a location in a call transcript/recording where the purpose of the call was mentioned. In some implementations, a simplified call summary is generated that focuses on creating a simplified summary of the most relevant parts of an utterance describing the purpose of the call. An analytics module 250 provides analytics functions, as discussed below in more detail.

The contact call center system 210 may be implemented as a network-based server system, an Internet-based web-server system, or a cloud-based or cloud-assisted service as a few examples. Customers communicate with the contact call system 210 via customer device 205. For example, a customer may communicate via a voice-link, video conference link, or a text (chat) link from a customer device 205 that may be a smartphone, tablet device, or laptop computer as a few examples.

A customer with an issue is routed to an agent at an agent device 201 where the agent device may, for example, be a computer. In practice, there may be a pool of agents (e.g., agents 1, 2 . . . M) and a customer is routed to an available agent based on one or more criteria. One or more managers may monitor ongoing conversations or access data regarding past conversation via a manager device 203 (e.g., a computer). A call center routing and support module 215 may be provided to support routing of customer queries.

Call attribute monitoring 220 may be performed. This may include monitoring the time of a call and the end of a call. However, in theory other attributes of the call may be monitored such as caller ID information (for phone calls), an IP address (for an Internet-based communication), or user-supplied attributes about a call, such as a user entering voice or text fields prior to their call being routed to an agent.

Figure 2B:
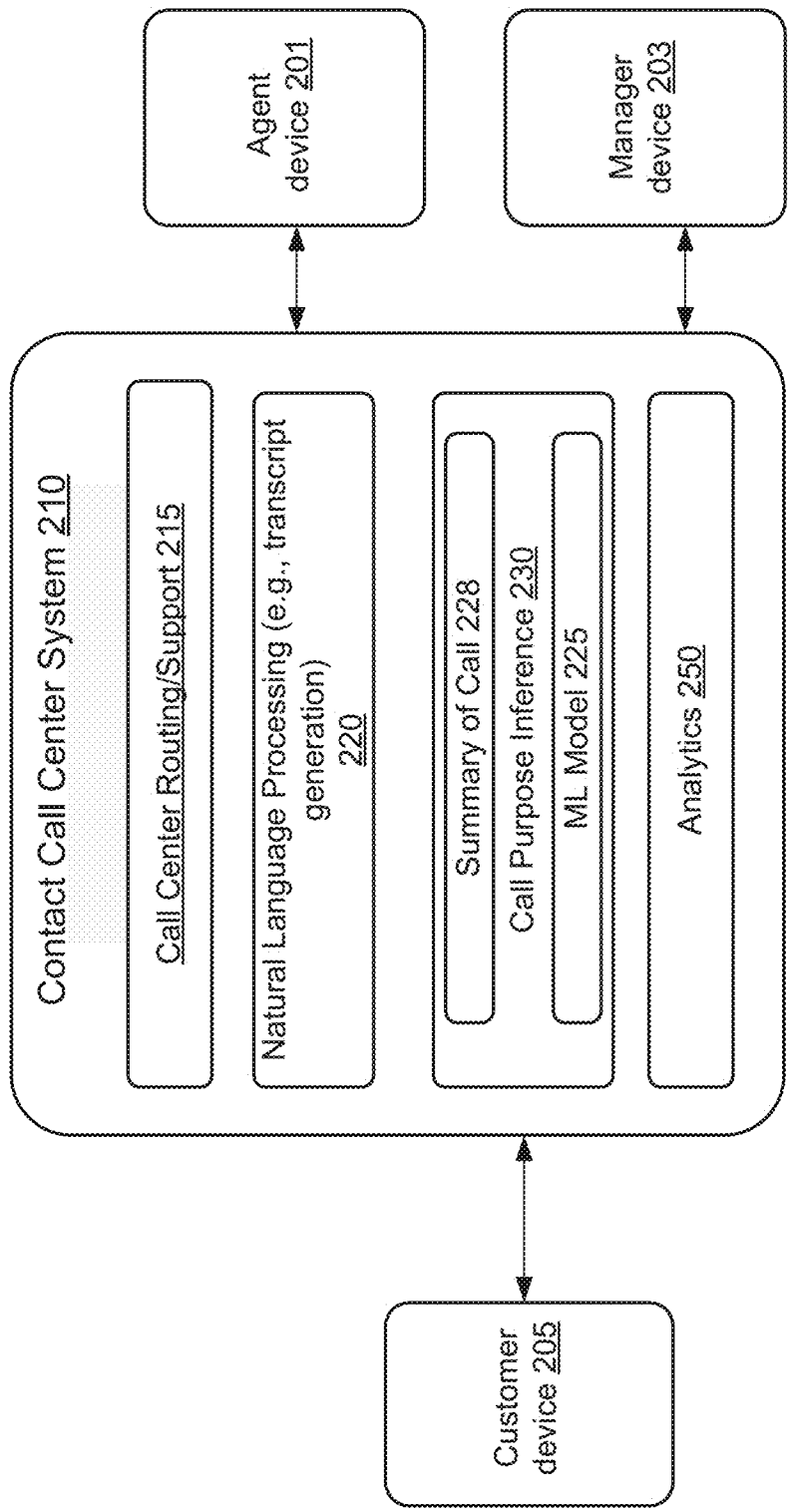
FIG. 2B is a block diagram illustrating an implementation of a contact call system with an inference module using a machine learning model to predict call purpose in accordance with an implementation.

FIG. 2B illustrates a variation of the contact call center system 210 in which the call purpose inference module 230 includes a machine learning model 225 trained to infer the purpose of a call. The machine learning model 225 may, for example, identify a score that is predictive of whether an utterance is likely to be a purpose of call. For example, the score may be a numeric score or a probability. The machine learning model may be trained on labeled examples of positive and negative cases in regards to purposes of call. In some implementations, the heuristic model may be used as an aid to generate labelled training data.

Figure 2C:
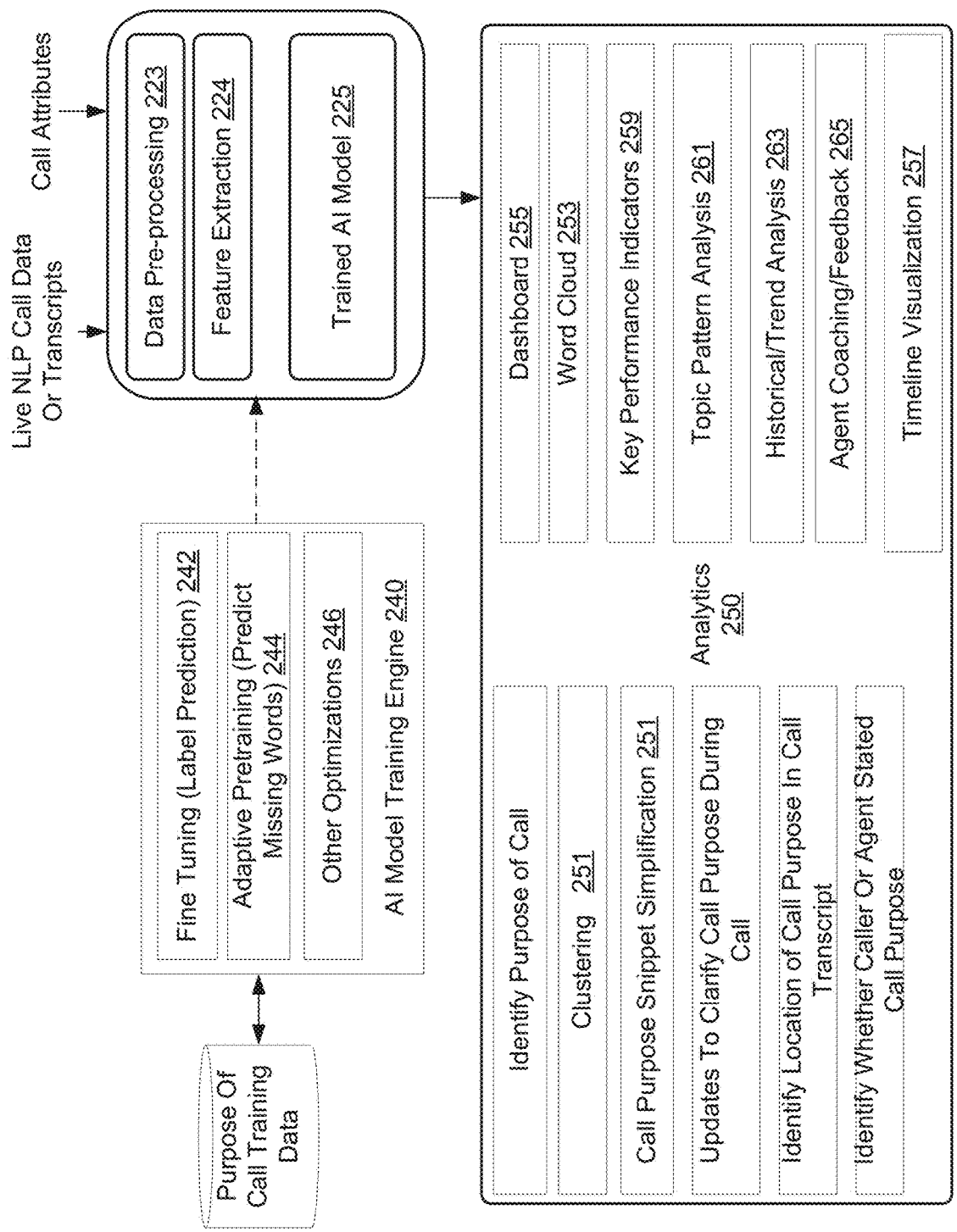
FIG. 2C is a block diagram illustrating an implementation of a contact call system of FIG. 2B showing more detailed aspects related to training of the machine learning model and examples of analytics function in accordance with an implementation.

FIG. 2C illustrates in more detail an example of a machine learning model implementation. The system receives either live ongoing NLP call data or recorded transcripts. Call attributes (e.g., time of call, total call time) may also be received. Data pre-processing 223 and feature extraction 224. The trained AI model 225 generates a series of inferences (predictions) about the purpose(s) of a call. The machine learning AI/ML model may be trained using training data using a training engine 240. The training engine 240 may include fine tuning (label prediction) 242, adaptive pretraining 244 to predict missing words, and optional optimization 246.

The analytics module 250 may include a variety of sub-modules to perform analytics function. An identifying purpose of call module 251 may be provided to generate information (e.g. call topics) to determine the purpose of the call.

A clustering module clusters calls 253. A call purpose snippet simplification module 255 takes a statement associated with a call purpose and simplifies the statement, e.g., shortening it, removing extraneous words, etc.

An update to clarify call purpose during call module 257 acts to clarify call purpose during a call. For example, as a call progresses, additional utterances may increase a confidence level associated with the prediction of the purpose of call. For example, a score or a probability percentage could be updated as the call progresses and a customer makes additional, stronger, or clearer statements about call purpose.

An identifying location of call purpose in call transcript module 259 may identify the location(s) in a call transcript in which a call purpose utterance occurred. For example, this information may be useful to aid a user to identify a portion of a call transcript or recording identifying the call purpose.

A module 261 to identify whether a call or agent stated the call purpose may be included to identify in reports who stated the call purpose. This may be useful for a variety of purposes, including agent training purposes, monitoring ongoing calls by a manager, etc. Identifying which party stated the call purpose may also be useful for other purposes.

A dashboard module 263 generates a dashboard visualization. For example, managers may desire various visualizations to understand the purpose of calls for previous calls or for ongoing calls. Various visualizations may be supported to aid a manager to understand not just the purpose of individual calls, but how that relates to other types of call information, such as call sentiment analysis, customer satisfaction scores, or other key performance indicators.

A variety of different specific visualization may be supported. A word cloud module 265 generates a word cloud visualization of purpose of call topics. A key performance indicators module 267 generates key performance indicators that include or are based on purpose of call information. A topic pattern analysis module 269 analyzed patterns in purpose of call topics. An historical/trend analysis module 271 generates information on historical data and trends. An agent coaching feedback module 273 generates feedback to agents based at least in part on the call purpose data. A timeline visualization module 275 generates timeline visualizations, such as visualization of call and portions of calls having a purpose of call. Knowing where the purpose of the call occurs in the timeline of a call allows the call to be to be divided into an opening section (everything in the call up to an including the purpose of call) and a main body of the call (where the utterance following the purpose of call is the beginning of the main body of the call).

Figure 3:
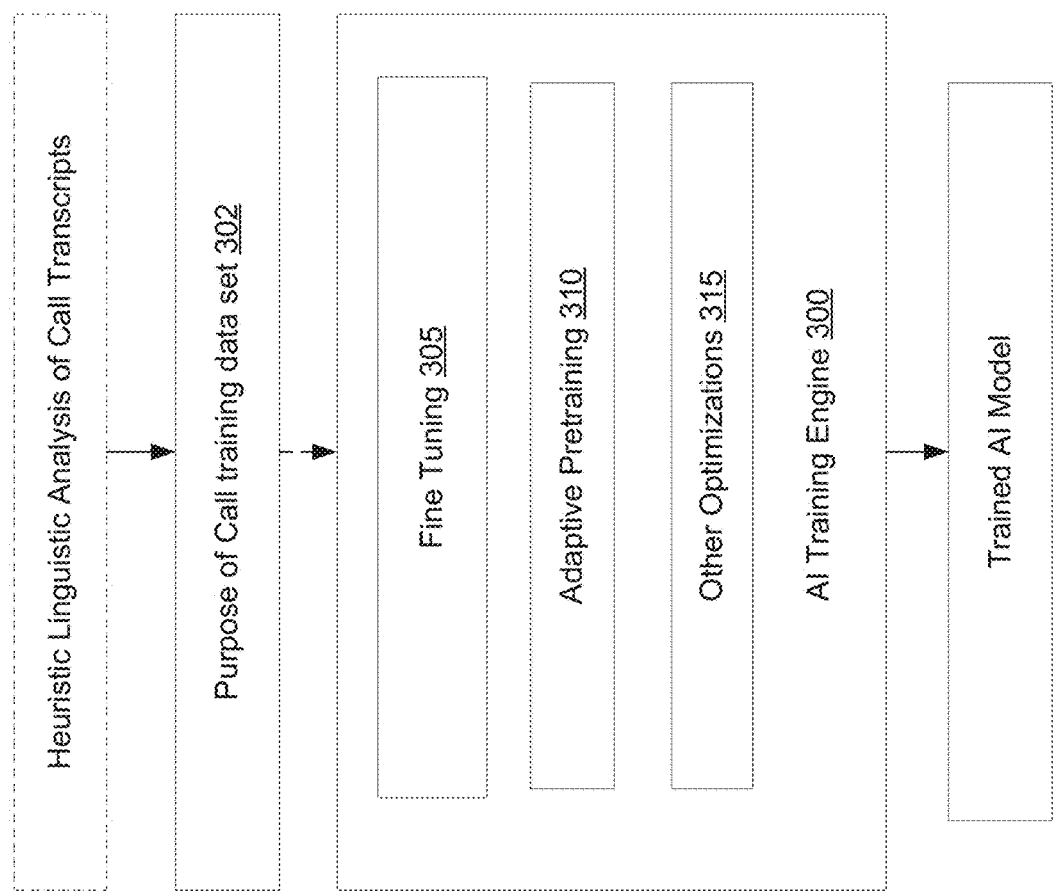
FIG. 3 is a diagram illustrating training of an AI model in accordance with an implementation.

FIG. 3 illustrates an example of an AI training engine 300 to train an AI model based on a purpose of call training data set 302. The AI training engine 300 may include a fine tuning module 305 for label prediction, adaptive pretraining module 310 to predict missing words, and optional other optimizations. In this example, the purpose of call training set may also optionally be based at least in part on a heuristic linguistic analysis of call transcripts. That is, while humans may label training data, at least some of the training data may be labelled by computer methods. For example, the previously discussed approach of using heuristic rules to identify purpose of call may be used to create a source of machine-labelled training data. Thus, while the training data set could be generated solely by having humans review and label data (without the heuristic linguistic analysis), the heuristic linguistic analysis may be used to provide an additional source of training data that may be used in combination with human reviewed data.

The trained machine learning model may be implemented in different ways. However, as an illustrative example, it may implement a multi-class classification model to classify individual utterances into a purpose of call, not a purpose of call, and optionally include other classification categories, such as agent's questions. Studies by the inventors suggest that a significant percentage of the time (e.g., about 16% in one study) the purpose of a call is revealed in a portion of a call corresponding to questions of an agent. For example, in one empirical study by the inventor, about 33% of the time the purpose of call was found in call purpose phrases, about 32% of the time in desire phrases, and about 16% of the time in questions.

The machine learning model may be implemented in many different ways. The machine learning model may be a pretrained model fine-tuned for a particular data set. Examples of model architectures that may be used include conversational BERT, Distilbert-base-cased models, and DialoGPT-small.

Figure 4:
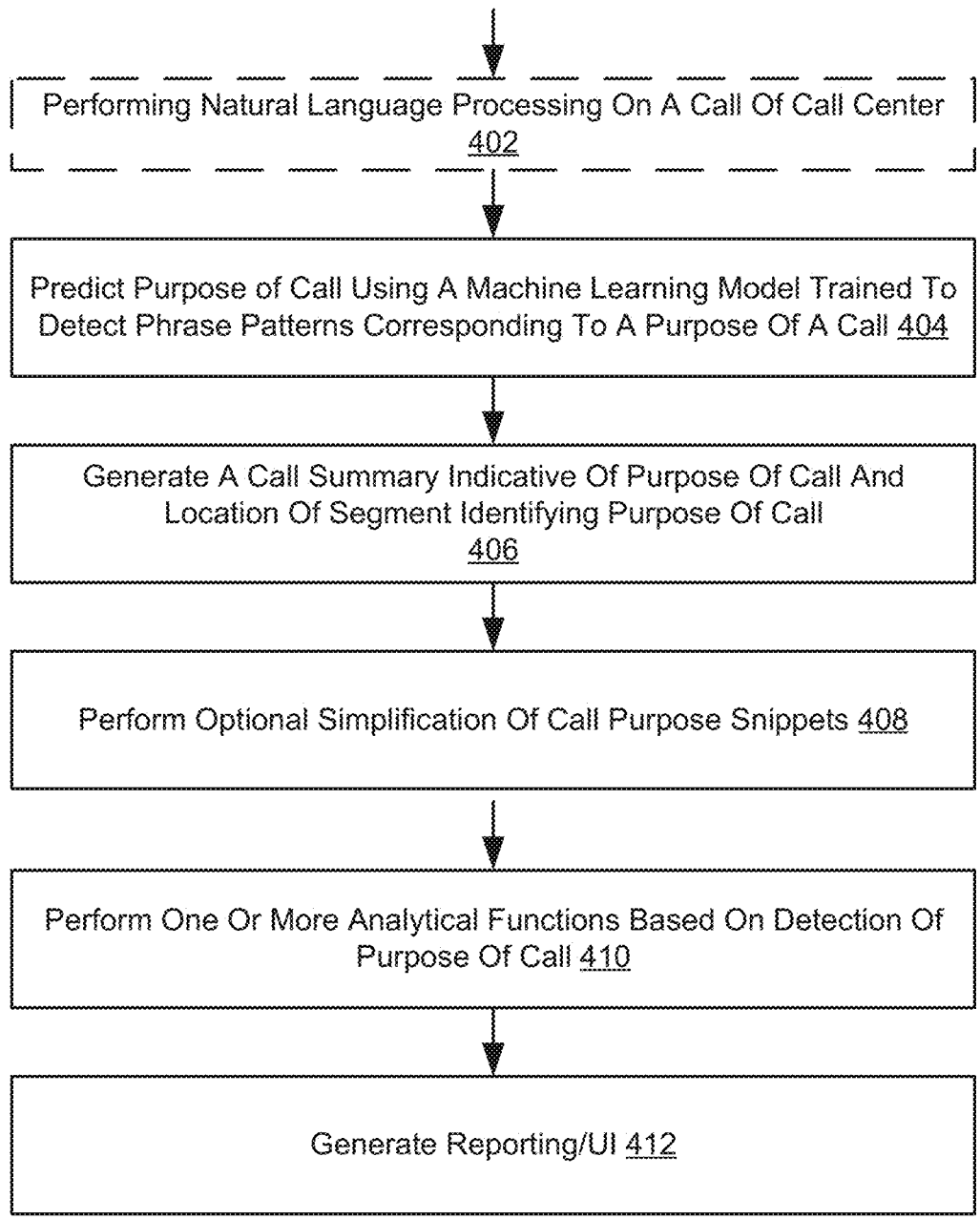
FIG. 4 is a flow chart of an example general method for generating and using a predicted purpose of a call to generate a call summary indicative of the purpose of the call and other optional analytics functions in accordance with an implementation.

FIG. 4 is a flowchart of a method in accordance with an implementation. In block 402, natural language processing (NLP) is performed on a call of a call center. In block 404, the method predicts a purpose of call using a machine learning model trained to detect phrase patterns in a call transcript corresponding to a purpose of call. In block 406, the predictions on the purpose of the call are used to generate a call summary indicative of the purpose of call and the location of a segment identifying the purpose of call. In block 408, an optional simplification of call purpose snippets is performed. This may include, for example, removing extraneous or irrelevant portions of a call purpose snippet. In block 410, one or more analytical functions are performed based on the purpose of the call. In block 412 a reporting user interface is generated.

While there may be a single utterance/snippet identified as defining a single purpose of call for a conversation, more generally there more than one purpose of call associated with two or more different utterances/snippet in different portions of the conversation. One or more rules may be employed to address this situation and identify the most relevant purpose of call and associated utterance/snippet. One rule is to choose the first utterance/snippet identifying a purpose of call and stop looking for additional utterances/snippets identifying a different purpose of call. For example, one rule could be that the first utterance/snippet having a purpose of call exceeding a pre-selected machine learning model score is selected as identifying the purpose of call. Another rule is to choose the utterance/snippet for which the purpose of call is assigned the highest score by the machine learning model. Other rules could also be used.

Figure 5:
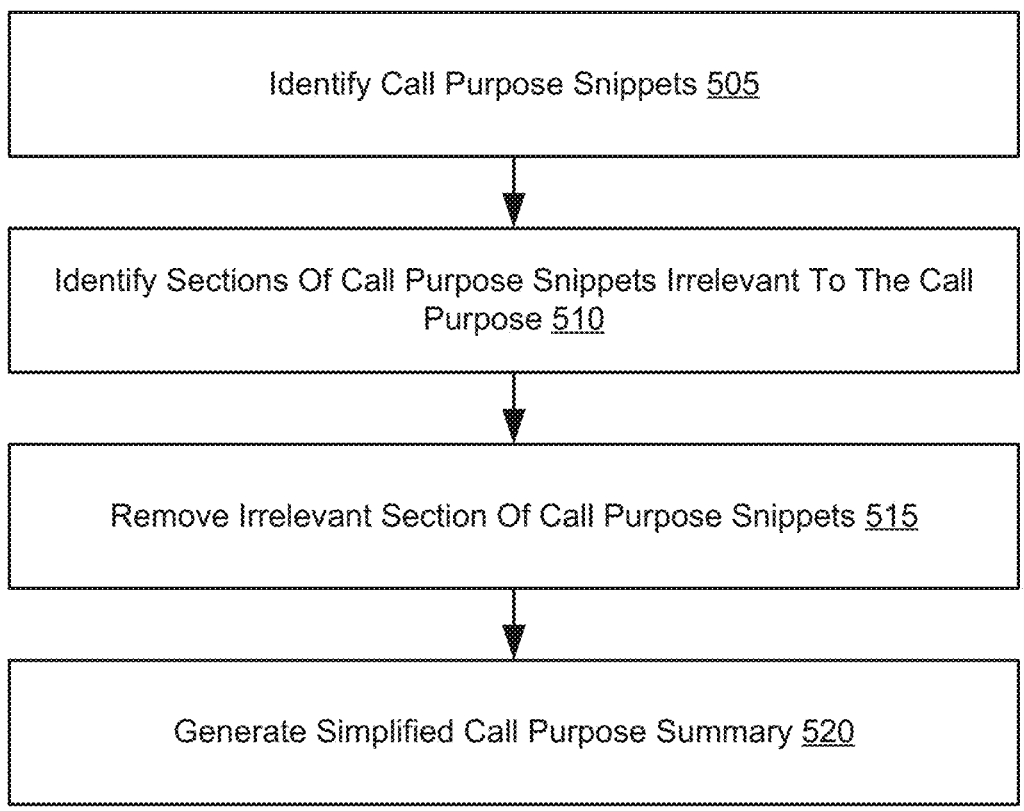
FIG. 5 is a flow chart of an example method for generating a simplified call purpose summary in accordance with an implementation.

FIG. 5 is a flow chart for generating a simplified call purpose summary. In block 505, call purpose snippets are identified. In block 510, call purpose snippets are identified that are irrelevant to the call purpose. In block 515, the irrelevant sections of the call purpose snippets are removed. In block 520, a simplified call purpose summary is generated.

Call purpose simplification may, for example, use heuristics to run regular expressions to identify sentences that are irrelevant to the call purposes, which are then removed. For example, a snippet may have one or more sentences or sentence portions that may be removed. Consider the Snippet, "Hi, I'm John Smith. But I need to return the computer because it doesn't work." The first sentence in this example snippet is unrelated to the second sentence regarding the call purpose.

Another technical option is to use sentence classification and rule-based trimming to perform call simplification. For example, an utterance may be segmented into sentences and classified to extract the sentence containing the call purposes. Classification may also be used to eliminate sequence of words not relevant to the call purpose.

In some implementations, purpose of call topics are automatically discovered and clustered according to a clustering algorithm. There are some purpose of call themes that are predictable and span many different organizations. For example, in many different organizations, customers call with the purpose of requesting a refund, cancelling an order or subscription, etc. However, there may also be some purposes of a call that are unique to specific industries or organizations. For example, people calling into a call center about changing cellphone service providers may have, as a purpose of call, asked about how to port phone numbers, how to deactivate a lost phone, etc. It's thus useful to support unsupervised discovery of topics and grouping of purpose of call utterance into meaningful themes or topics by organization or call center.

Clustering of call utterance may be used, for example, to discover reasons why customers call into call centers or identify trends and patterns. For example, if a company launches a new product release, it would be useful to know if there are a lot of complaints or requests for refunds. A clustering pipeline may be implemented in different ways, but in some implementations includes unsupervised topic discovery and assigning utterances to different clusters.

Clustering can be done at different levels of technical sophistication. For example, unsupervised topic discovery may include truncating call purpose utterance to exclude portions of the utterances unrelated to call purpose such as introductions and greetings. Patterns of interest may be selected by using regexes on the call purpose utterances, looking for patterns of interest such as noun phrases, verbs, proper nouns, verb and noun phrases, and negated verbs. Frequency counts of patterns may be compiled to identify the n-most common patterns (e.g., the 100 most common patterns). Some patterns may also be disqualified based on disqualification criteria such as people's names, swear words, or verbs or nouns that are unlikely to be relevant.

Once a set of patterns are identified, they can be used to identify an initial set of topics. Topic pairs may be encoded and clustered based on a similarity calculation. Clustering may be used, for example, to generate clusters of topics that are different verb conjugations of the same verb or semantically similar topics. After creating topic clusters, utterance may be assigned to topic clusters based on a keyword search or a phrase level semantic similarities. For example, a topic cluster might cluster different verb conjugations for the verb "cancel" or cluster semantically similar topics related to the topic of a "problem."

Clusters may also be merged based on similarity of cluster contents. Cluster contents may also be automatically named. Other options may also be supported to make the process convenient for end-users.

Figure 6:
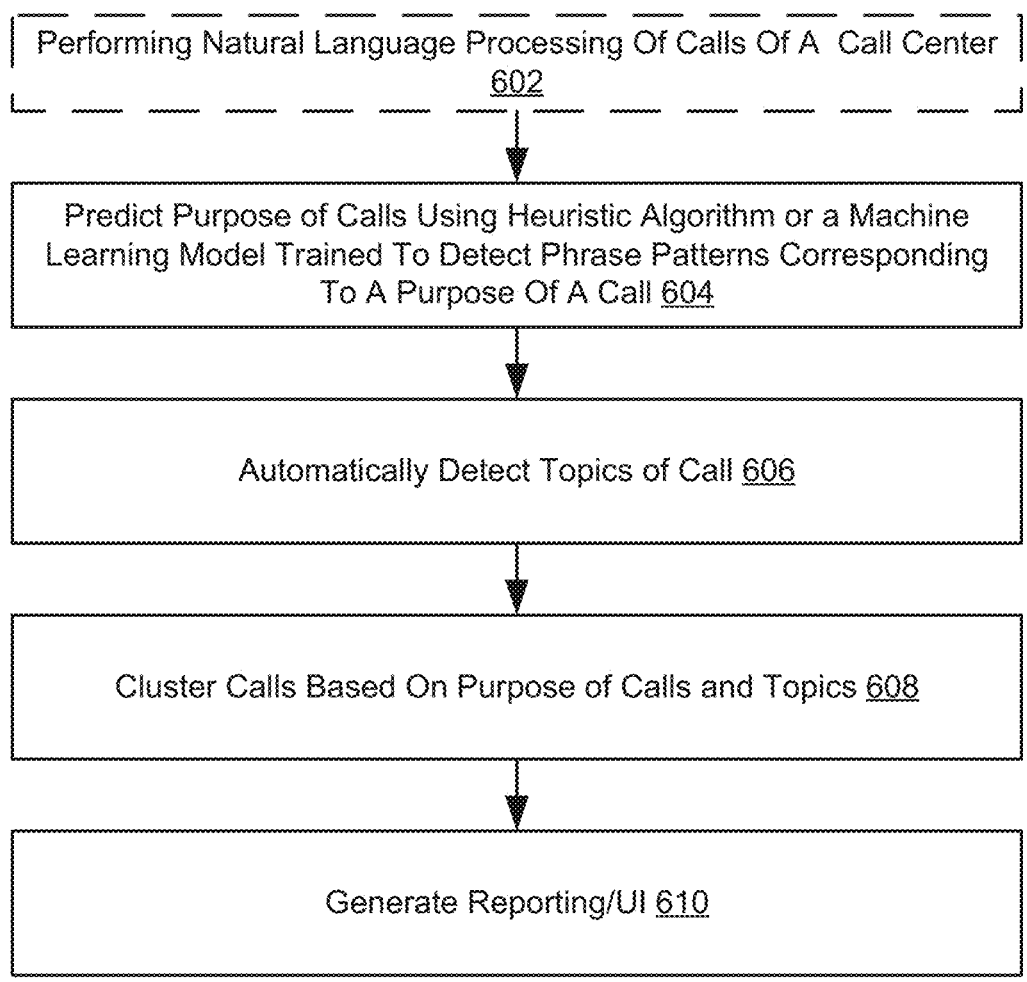
FIG. 6 is a flow chart of a high-level method automatically detecting topics of call and clustering calls in accordance with an implementation.

FIG. 6 is a flowchart of a method of clustering in accordance with an implementation. In block 602, natural language processing is performed on calls of a call center. In block 604, the purpose of calls is predicted. This can be implemented using either a heuristic algorithm or by a machine learning model trained to detect phrase patterns. In block 606, the method automatically detects topics of a call. In block 608, calls are clustered based on the purpose of calls and topics. In block 610, a reporting user interface is generated.

Figure 7:
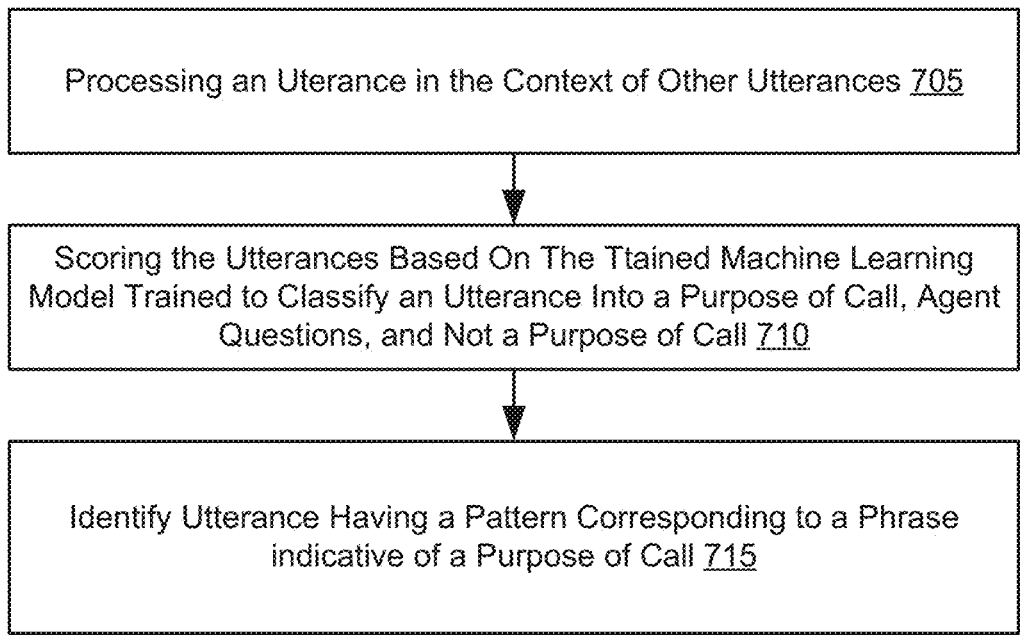
FIG. 7 is a flow chart of a method of using a machine learning model trained to classify utterances and identify utterances having phrases indicative of a purpose of call in accordance with an implementation.

FIG. 7 is a flowchart of an example of a method for initially identifying utterances having a pattern corresponding to phrases indicative of purposes of a call. In block 705, utterances are processed in the context of other utterances. In block 710, the utterances are scored based on a machine learning model to classify the utterance. In one example, the trained learning model classifies utterances into a purpose of call, agent questions, and not a purpose of call. In block 715, the method positively identifies utterances having a pattern corresponding to a phrase indicative of a purpose of call.

Figure 8:
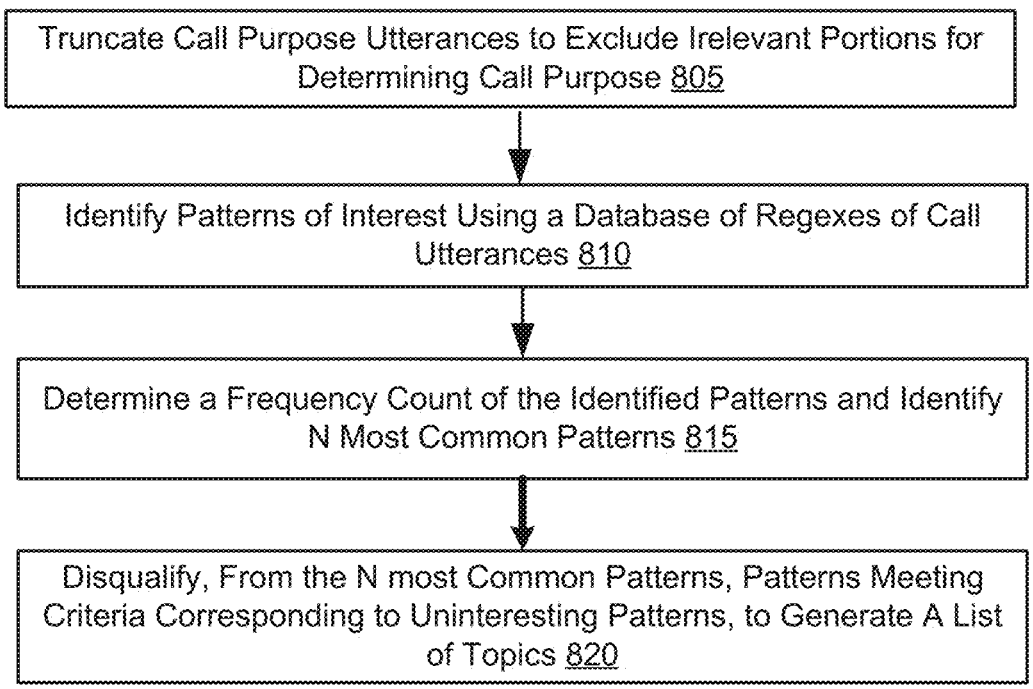
FIG. 8 is a flow chart of a method of generating an initial list of topics in accordance with an implementation.

FIG. 8 is a flowchart of a method of generating an initial list of topics in accordance with an implementation. In block 805, a truncation is performed of call purpose utterances to exclude irrelevant portions in regards to determining call purposes. In block 810, patterns of interest are identified using a database of regexes of call utterances. In block 815, a frequency count is determined of the identified patterns and the most common N patterns are identified, where N is a positive integer (e.g., N=20, N=40, N=100, or some other pre-selected number). In block 820, uninteresting patterns are disqualified from the N most common patterns to generate a list of topics.

Figure 9:
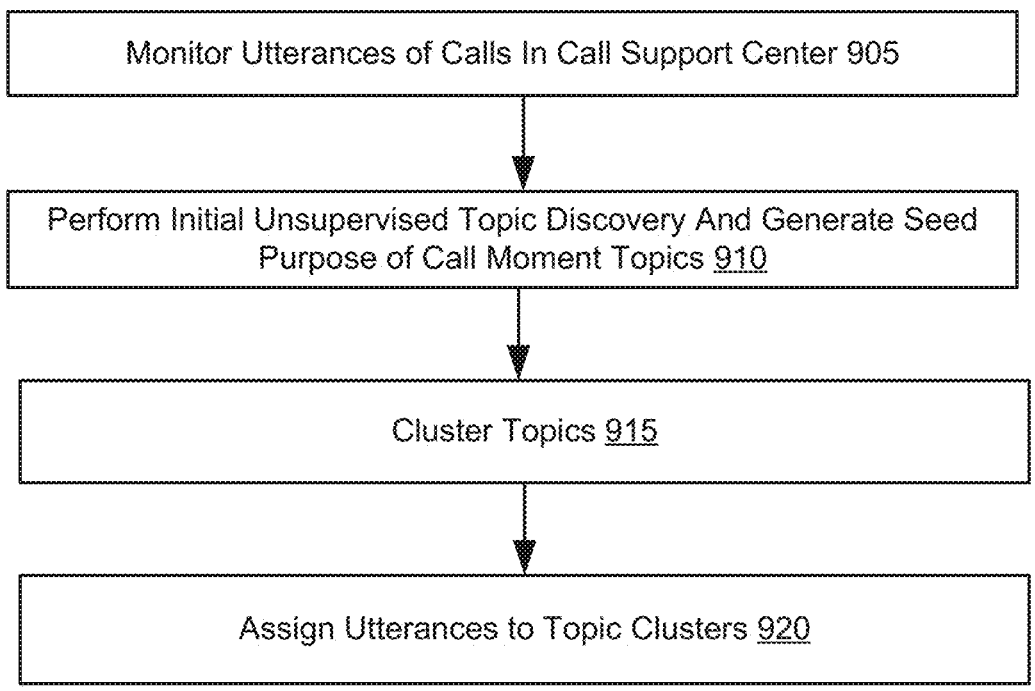
FIG. 9 is a flowchart of a method of automatically generating seed topics, clustering topics, and assigning utterances to topic clusters in accordance with an implementation.

FIG. 9 is a high level flow chart of a method of assigning individual utterances to clusters. In practice, a large number of initial topics are generated. Topics are then clustered, and individual utterances are assigned to clusters. In block 905, utterances are monitored in a call support center. In block 910, an initial phase of unsupervised topic discovery is performed and seed purpose of call moments are generated. In block 915, topics are clustered. In block 920, utterances are assigned to topic clusters.

Figure 10:
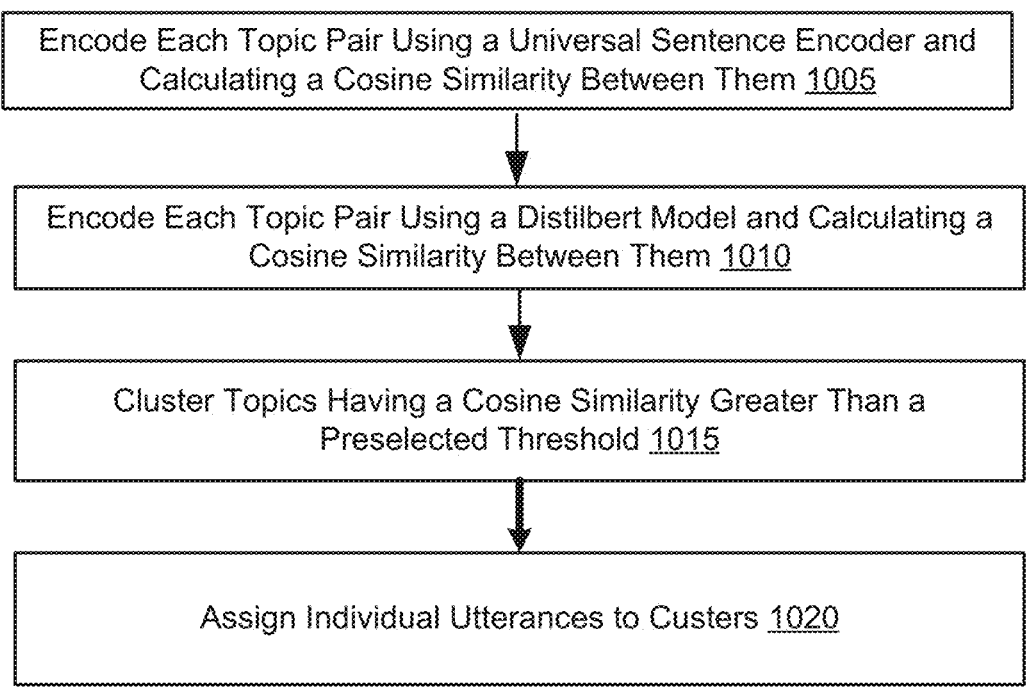
FIG. 10 is a flowchart of assigning utterances to clusters in accordance with an implementation.

FIG. 10 is a flowchart of a particular method of assigning individual utterances to clusters. In block 1005, each topic pair is encoded using a universal sentence encoder and by calculating a cosine similarity between them. In block 1010, each topic pair is encoded using a DistilBERT model and by calculating a cosine similarity between them. In block 1015, topics having a cosine similarity greater than a preselected threshold are clustered. In block 1020, individual utterances are assigned to clusters.

A variety of different user interface options may be used to display purpose of call information. Some example screenshots of user interface will now be discussed, although it will be understood that many variations are possible.

Figure 11A:
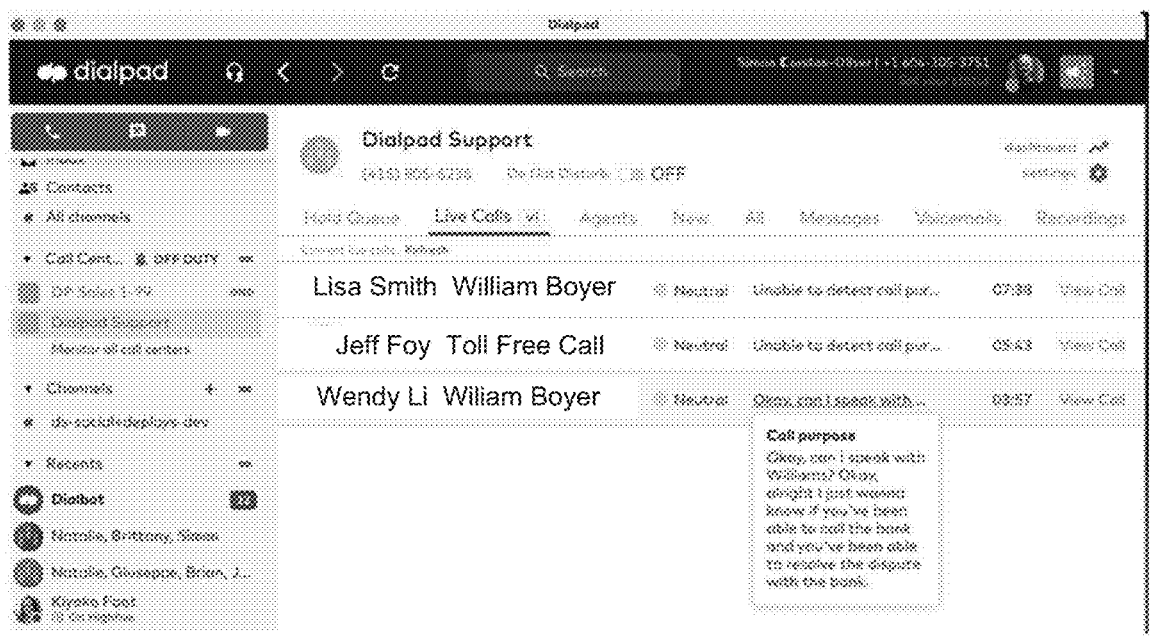
FIG. 11A is a screenshot showing call participant information, sentiment, and call purpose information in accordance with an implementation.

FIG. 11A illustrates an example of a user interface. In one example of a support user interface, information on calls, agents, call sentiment, voicemails, and recordings are displayed. Call purpose for a live call, voicemail, or recorded call may be displayed. In this example, a pop-up window displays call purpose details, although other user interface techniques may be used to open up the purpose of call information.

Figure 11B:
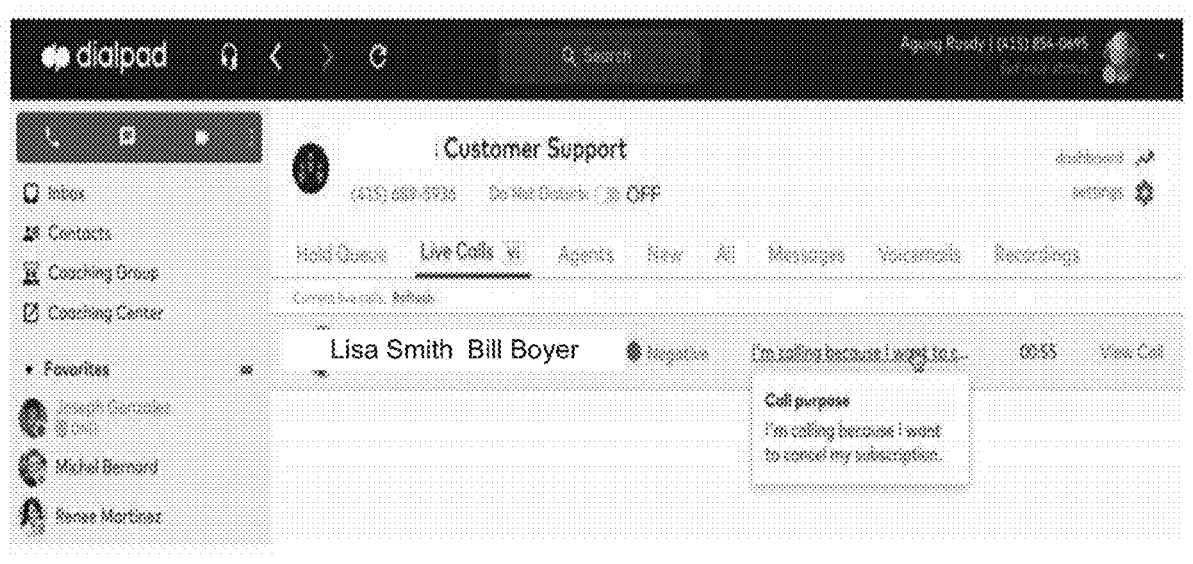
FIG. 11B is a screenshot showing an individual live call with call sentiment and call purpose in accordance with an implementation.

FIG. 11B is an example of a user interface showing information for an individual call and its call purpose. This may include, for example, providing a transcript or a snippet of the call related to the call purpose.

Figure 11C:
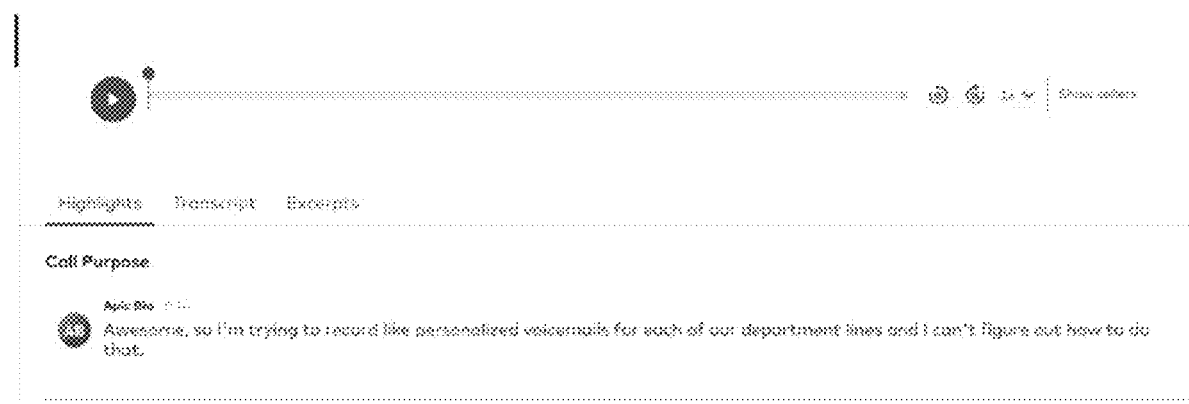
FIG. 11C is a screenshot showing an individual call recording/transcript with call purpose highlights in accordance with an implementation.

FIG. 11C illustrates an example of a call recording user interface. A user may play the call recording, view a transcript, or view call excerpts. The call purpose is illustrated as being displayed with the call highlights.

Figure 11D:
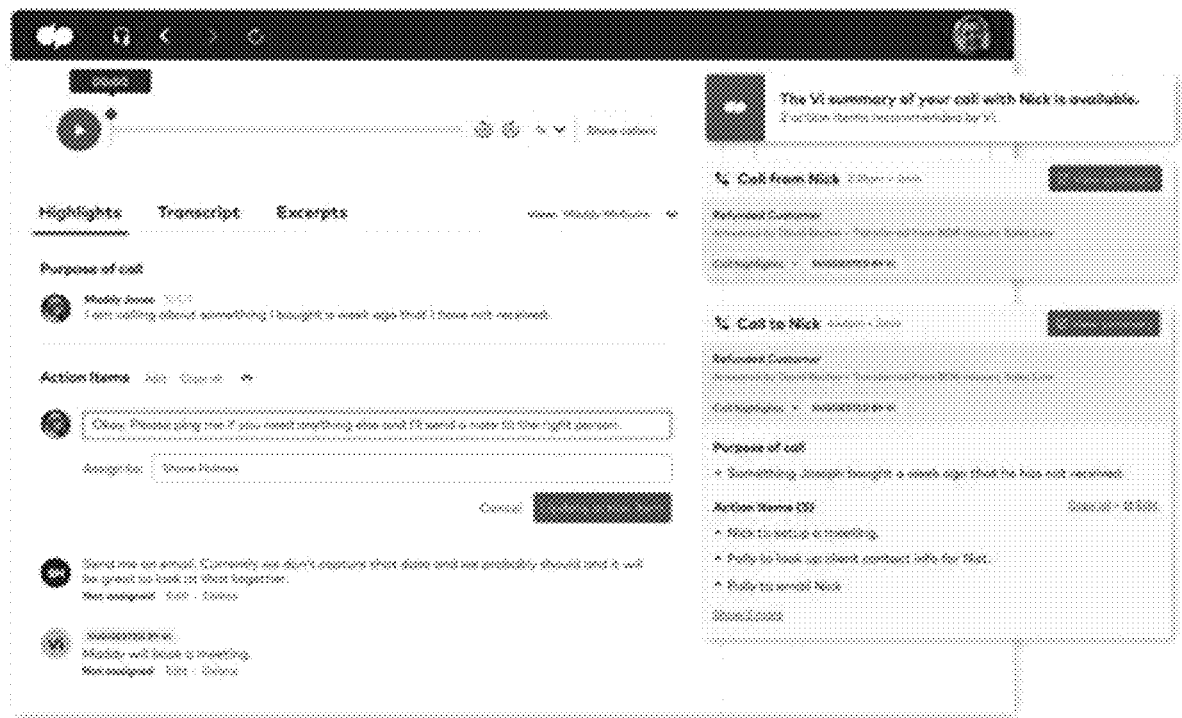
FIG. 11D is a screenshot showing an example of a call recording/transcript, highlight, excerpts, action items, and purpose of call in accordance with an implementation.

FIG. 11D shows another example of a user interface for a recorded call. The purpose of the call may be provided to a user. In some implementations, a call summary is also generated. In some implementations, action items are also generated for a call.

Figure 11E:
FIG. 11E is a screenshot showing an example of a call review mode with a display of call review in accordance with an implementation.

FIG. 11E shows an example of a call history/call summary user interface. In this example, the call purpose. This may include, for example, providing a transcript or a snippet of the call related to the call purpose.

Figure 11F:
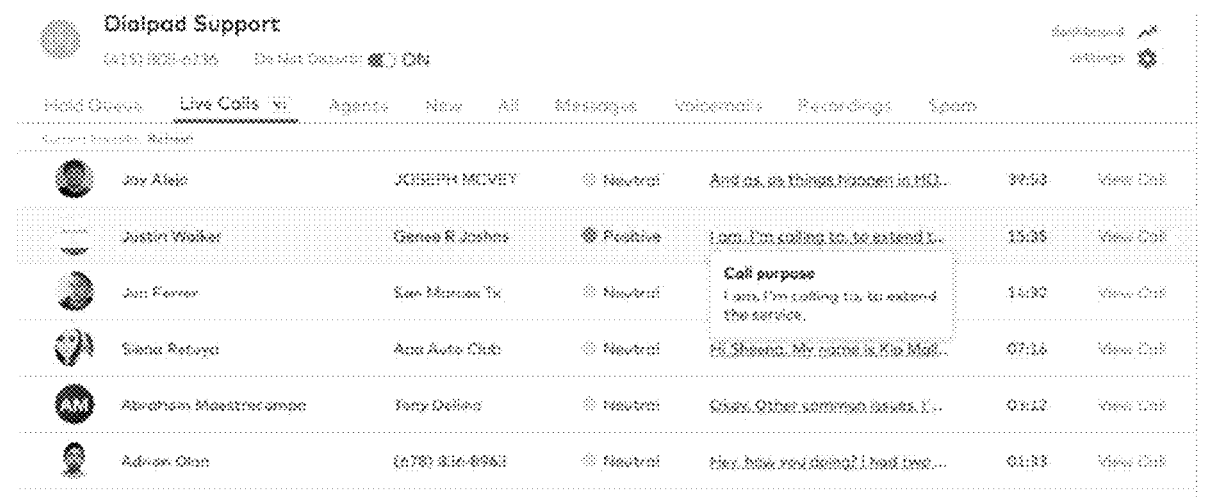

FIG. 11F shows an example of a support interface that shows call purpose and also call sentiment (e.g., positive, neutral, or negative).

Figure 11G:
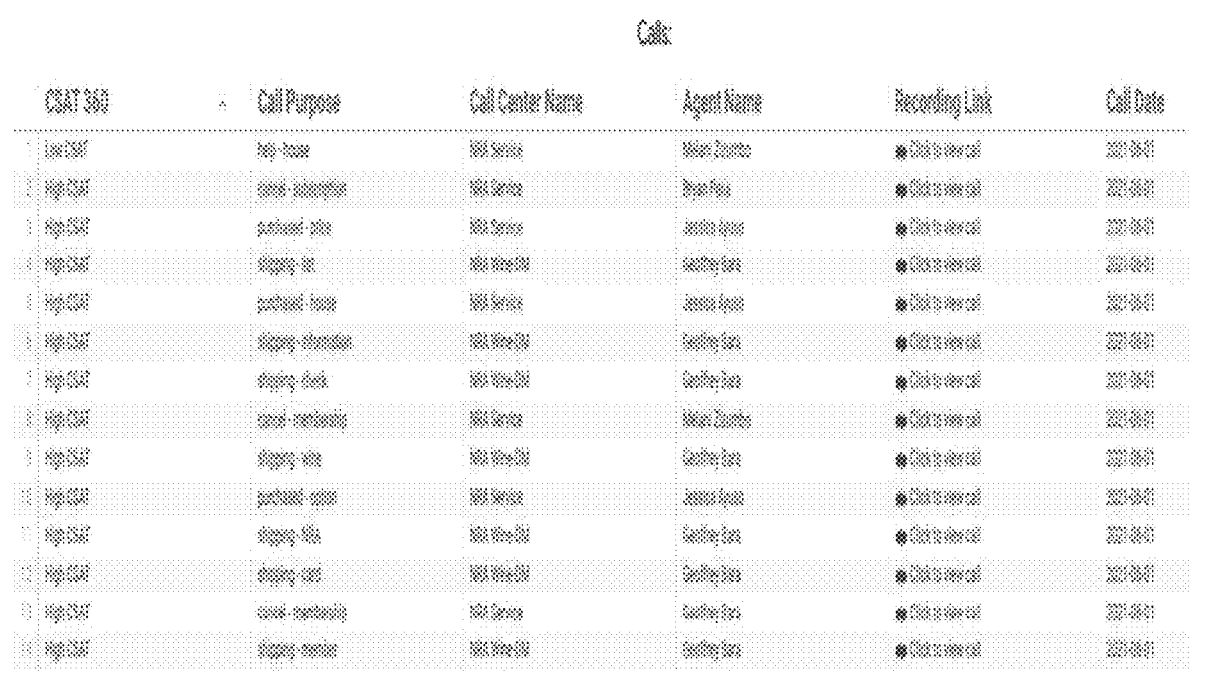

FIG. 11G illustrates another example of a user interface providing call purpose information and customer satisfaction (CSAT) information. Additional information on agent name, call date, and recording link may be provided.

Figure 11H:
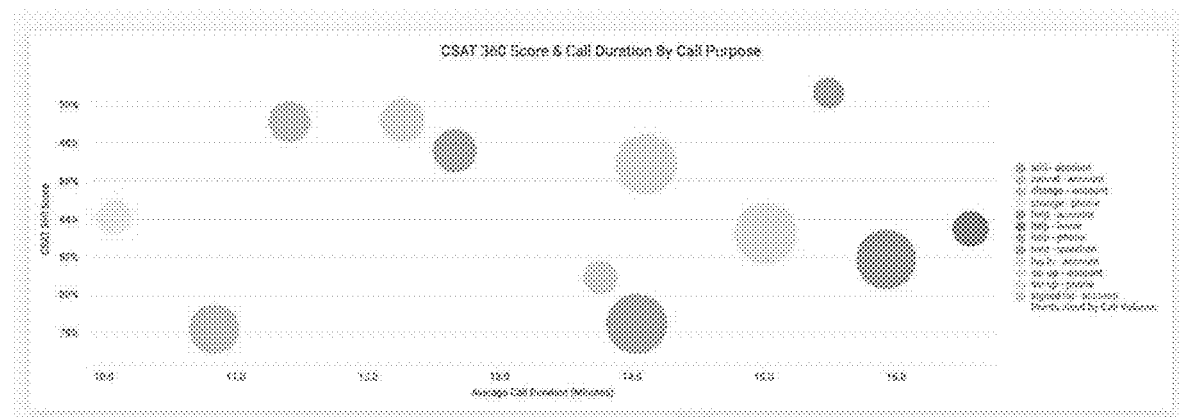
FIG. 11H is a screenshot showing CSAT scores, call duration, and call purpose in accordance with an implementation.

FIG. 11H shows an example of a multivariate plot showing CSAT and call duration by call purpose. The vertical axis is CSAT score. The horizontal axis is call duration. Each circle corresponds to a different call purpose.

Figure 11I:
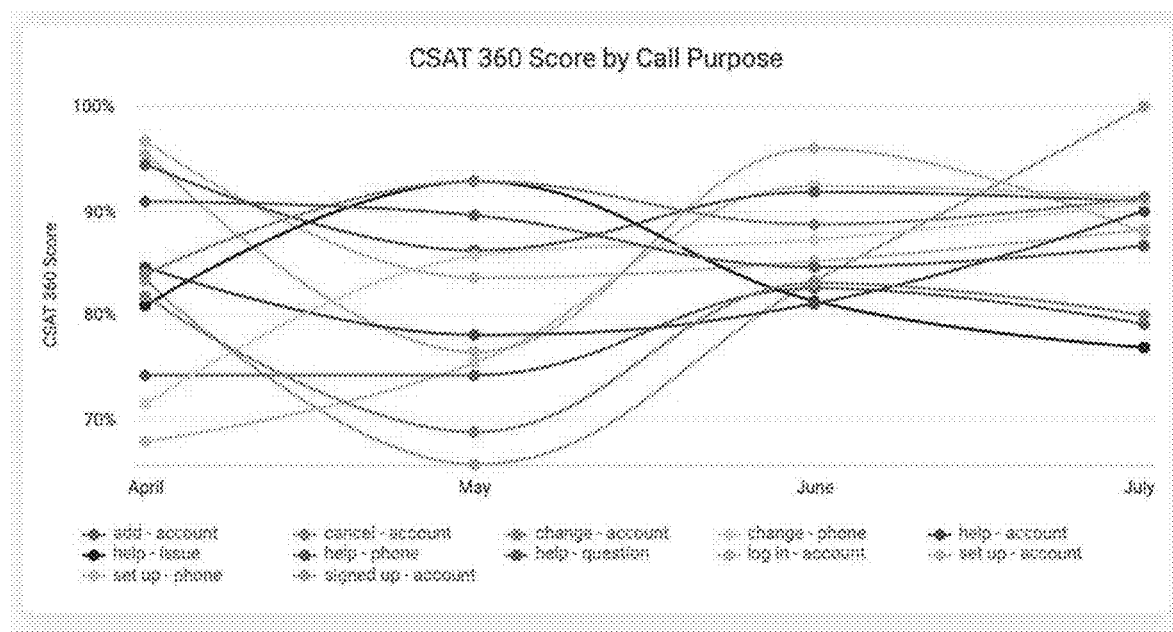
FIG. 11I illustrates a screenshot of CSAT score by call purpose in accordance with an implementation.

FIG. 11I shows plots of CSAT score by call purpose over time. This type of visualization permits CSAT to be viewed over time for different call purposes such as to cancel an account, change an account, sign up an account, etc.

Figure 11J:
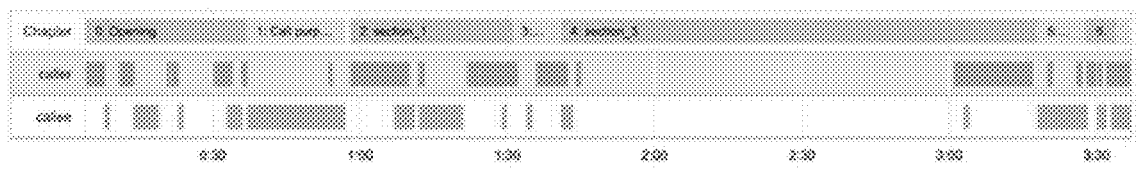
FIG. 11J illustrates a screenshot showing an identification of caller, callee, and utterances having a call purpose in accordance with an implementation.

FIG. 11J is a visualization illustrating a recording of a call and portions of the call in which the caller or the callee describe the purpose of the call. This may be useful, for example, to play back the portion of a call that describes the purpose of the call.

Figure 11L:
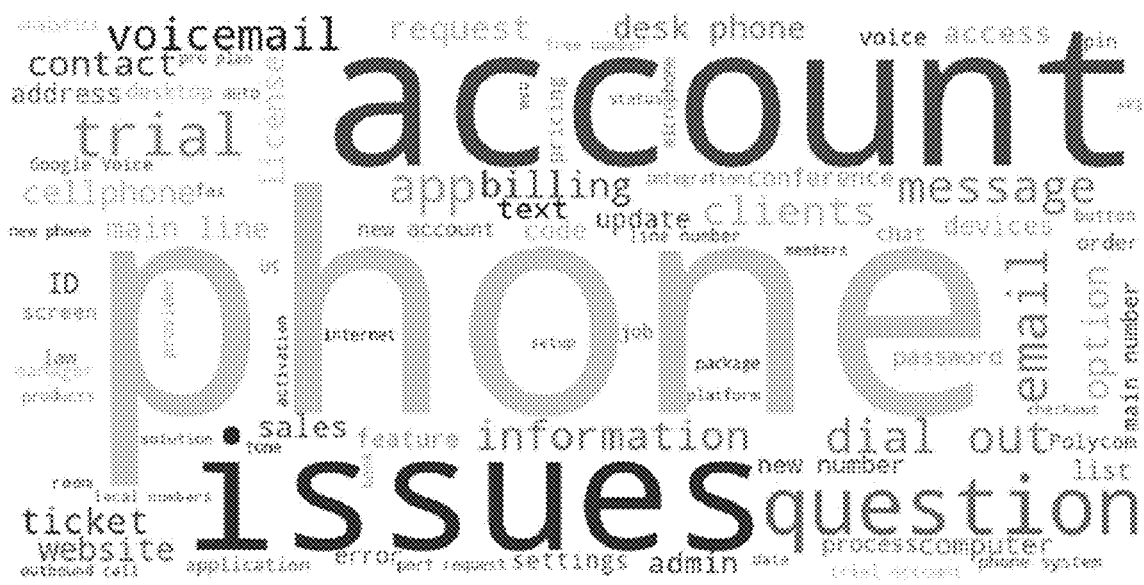
FIG. 11L illustrates a screenshot of a word cloud implementation in accordance with an implementation.
Figure 11M:
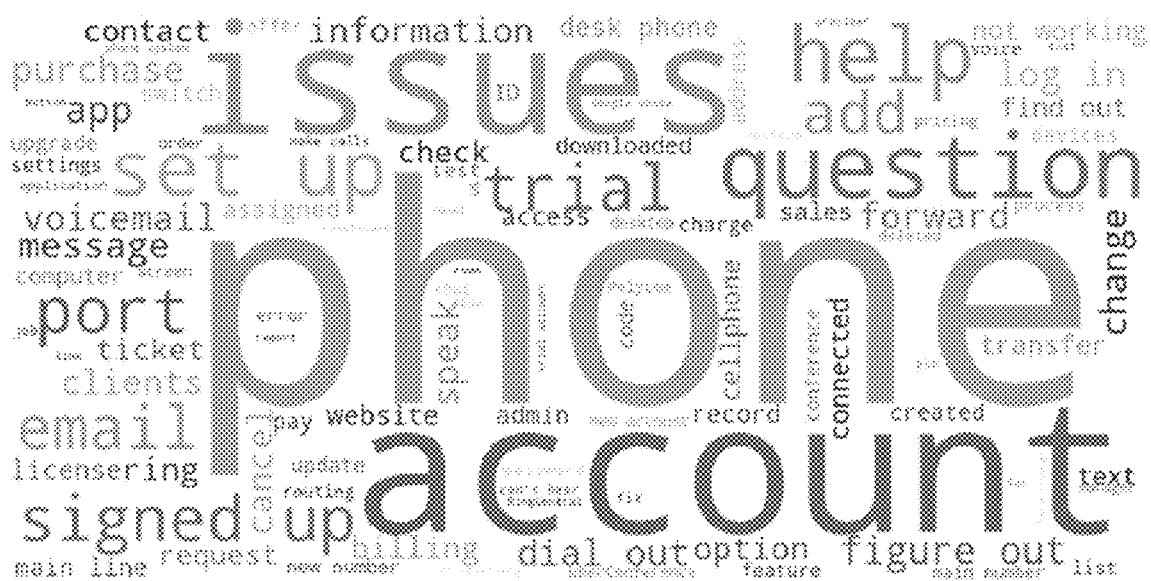
FIG. 11M illustrates a screenshot of a word cloud implementation in accordance with an implementation.

FIGS. 11K, 11L, and 11M illustrate examples of word clouds to illustrate purpose of call verbs (FIG. 11K), verbs (FIG. 11L), and a mixture of verbs and nouns (FIG. 11M).

Figure 12:
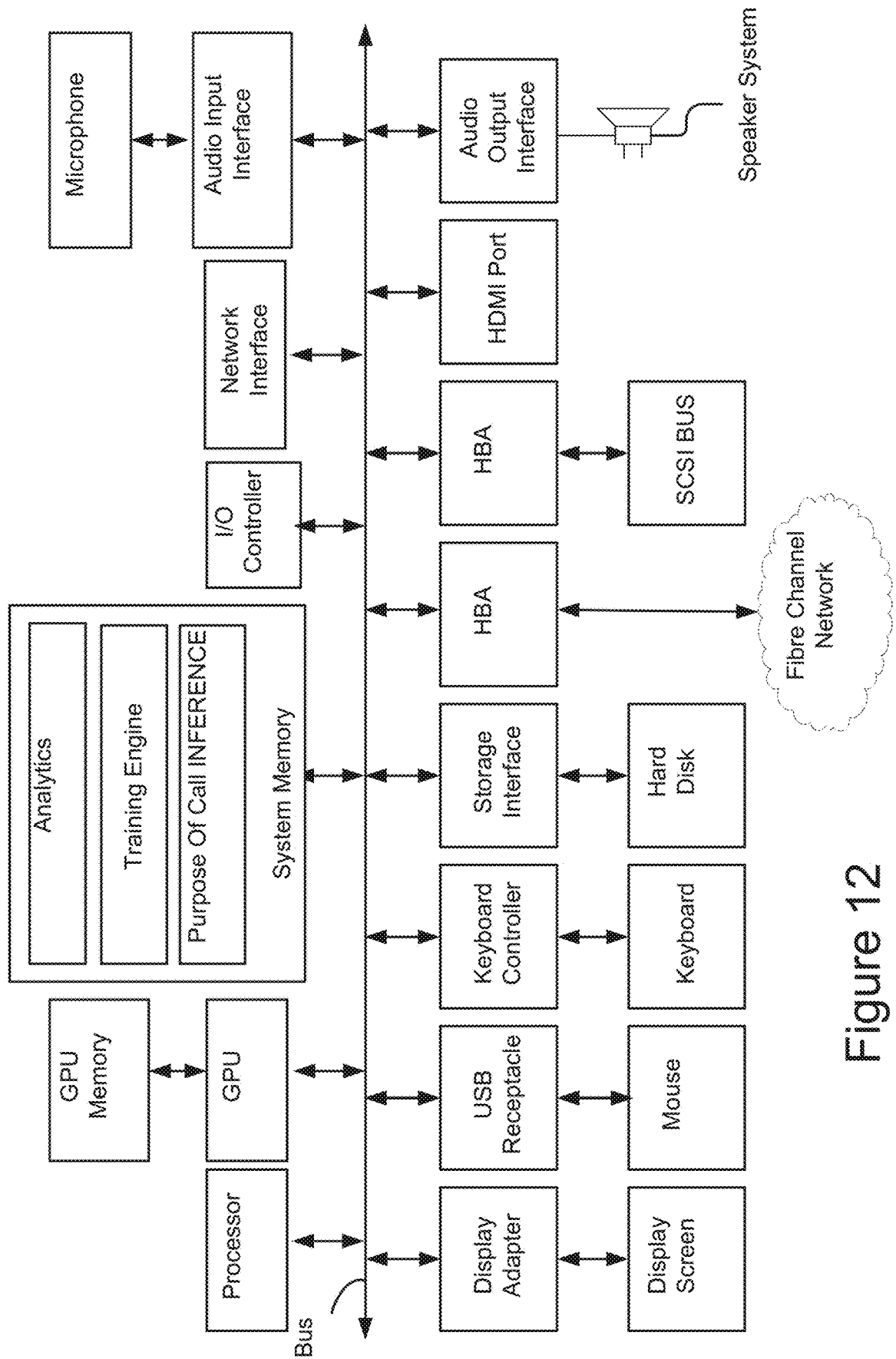
FIG. 12 is a block diagram illustrating a server-based implementation of the system in accordance with an implementation.

FIG. 12 illustrates a server based implementation in accordance with an implementation. A system memory may include software module to perform methods and functions associated with purpose of call inference, a training engine, and analytics. A communications bus may be provided for computer/server implementations and support a network interface. It will be understood that any of the previously discussed methods may be implemented using computer program instructions stored on a tangible computer readable medium and executable by a processor. Similarly, the user interfaces described may also be implemented in software stored on computer readable medium executable by a processor. However, as previously discussed, a server based implementation is one of my options. Other options included cloud-based or cloud-assisted implementations, to name a few examples.

Many variations on the above-described techniques are possible. Also while examples have been described for the English language, more generally the technique may be applied to a wide variety of different languages (e.g., French, Spanish, German, Chinese, Japanese, Russian, etc.)

While examples have been described in regards to determining call purpose in call centers, it will be understood that there may be other potential application in other types of conversations. Thus, it will be understood that embodiments of the disclosure are not limited to call center applications.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments", or "an embodiment", means that a particular feature, structure, or characteristic, described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation, or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method, comprising:
providing transcripts and call attribute data of calls, between customers and agents of a call center, as inputs to an inference engine configured to predict a call purpose of customers for utterances within individual calls having phrases indicative of a call purpose;
automatically generating an initial set of topics from the predicted call purpose;
clustering topics;
assigning utterances of at least one call to topic clusters;
identifying snippets of calls describing call purpose;
simplifying the identified snippets of calls describing call purpose to generate simplified snippets;
identifying locations of simplified snippets of calls describing call purpose within transcripts or recordings of calls; and
generating a timeline visualization of purpose of call with a visual indicator indicative of a time interval with a call in which a snippet describing a purpose of call was expressed.

2. The computer-implemented method of claim 1, wherein the inference engine comprises a machine learning model trained to predict call purpose.

3. The computer-implemented method of claim 1, wherein the inference engine comprises a heuristics model trained to predict call purpose.

4. The computer-implemented method of claim 1, wherein the inference engine utilizes at least one rule to select a single most relevant call purpose from a plurality of utterances in a call having phrases indicative of a call purpose.

5. The computer-implemented method of claim 1, further comprising identifying whether a caller or a callee stated a call purpose.

6. The computer-implemented method of claim 1, further comprising analyzing patterns of topics.

7. The computer-implemented method of claim 1, wherein the timeline visualization distinguishes an opening section of the call up to and including a purpose of call utterance and a main body section subsequent to the purpose of call utterance.

8. A computer-implemented method, comprising:
receiving, in an inference engine, transcripts of calls and call attribute data for calls between callers and callees, wherein the callers are customers and the callees are agents of a call center;

predicting, a purpose of call of utterances of the calls by a machine learning model of the inference engine trained to classify utterances into at least two categories that include purpose of call and not a purpose of call;

automatically discovering topics and clustering call by call purpose;

generating, by an analytics engine, an analysis of the purpose of call for at least one customer;

identifying snippets of calls having utterances describing call purpose;

determining locations within calls of the identified snippets having utterances describing call purpose; and generating an indicator of a time interval within a call in which one or more snippets describing the purpose of call was expressed.

9. The computer-implemented method of claim 8, wherein the machine learning model is trained to classify utterances into at least three categories that include purpose of call, not a purpose of call, and questions asked by the callee.

10. The computer-implemented method of claim 8, further comprising simplifying the identified snippets of calls describing call purpose.

11. The computer-implemented method of claim 8, further comprising identifying whether a customer or agent stated a call purpose.

12. The computer-implemented method of claim 8, further comprising analyzing patterns of topics.

13. The computer-implemented method of claim 8, further comprising generating a timeline visualization of purpose of call with a visual indicator indicative of a time interval within a call in which a purpose of call was expressed.

14. The computer-implemented method of claim 8, further comprising generating a key performance indicator based on purpose of call data.

* * * * *